United States Patent
Arai et al.

(10) Patent No.: US 9,880,034 B2
(45) Date of Patent: Jan. 30, 2018

(54) FLOW SENSOR

(71) Applicant: Hitachi Automotive Systems, Ltd., Hitachinaka-shi, Ibaraki (JP)

(72) Inventors: Satoshi Arai, Tokyo (JP); Shigeharu Tsunoda, Tokyo (JP); Shinobu Tashiro, Hitachinaka (JP); Takeshi Morino, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 206 days.

(21) Appl. No.: 14/769,573

(22) PCT Filed: Feb. 7, 2014

(86) PCT No.: PCT/JP2014/052831
§ 371 (c)(1),
(2) Date: Aug. 21, 2015

(87) PCT Pub. No.: WO2014/156322
PCT Pub. Date: Oct. 2, 2014

(65) Prior Publication Data
US 2015/0377670 A1    Dec. 31, 2015

(30) Foreign Application Priority Data
Mar. 25, 2013 (JP) .................. 2013-061297

(51) Int. Cl.
*G01F 1/684* (2006.01)
*G01F 5/00* (2006.01)
(Continued)

(52) U.S. Cl.
CPC ........ *G01F 1/6842* (2013.01); *B29C 65/1635* (2013.01); *B29C 65/1654* (2013.01);
(Continued)

(58) Field of Classification Search
None
See application file for complete search history.

(56) References Cited

U.S. PATENT DOCUMENTS

2004/0060361 A1* 4/2004 Kozawa ............... G01F 1/6842
73/753
2008/0254242 A1* 10/2008 Asada .................. B29C 66/542
428/34

(Continued)

FOREIGN PATENT DOCUMENTS

JP      11-258019 A      9/1999
JP      2004-209916 A    7/2004
(Continued)

OTHER PUBLICATIONS

Kagan et al.; Laser Transmission Welding of Semi-Crystalline Thermoplastics—Part I: Optical Characterization of Nylon Based Plastics; Dec. 2002; Journal of Reinforced Plastics and Composites; vol. 21, pp. 1101-1122.*

Acherjee et al.; Prediction of weld strength and seam width for laser transmission welding of thermoplastic using response surface methodology; May 2009; Optics & Laser Technology; vol. 41; pp. 956-967.*

(Continued)

*Primary Examiner* — Daniel J Colilla
(74) *Attorney, Agent, or Firm* — Crowell & Moring LLP

(57) ABSTRACT

Provided is a low-cost flow sensor which improves productivity while maintaining high quality and high reliability. This flow sensor is provided with a housing, a cover, a circuit chamber sealed between these and housing electronic components or wiring, and a subpassage through which the fluid flows that is to be detected, and is characterized in that the welding width of a first welded portion forming the circuit chamber is greater than the welding width of a part of the second welded portion forming the subpassage unit.

15 Claims, 20 Drawing Sheets

(51) Int. Cl.
*B29C 65/00* (2006.01)
*B29L 31/34* (2006.01)
*B29C 65/16* (2006.01)
*B29K 105/00* (2006.01)

(52) U.S. Cl.
CPC .......... *B29C 66/112* (2013.01); *B29C 66/114* (2013.01); *B29C 66/242* (2013.01); *B29C 66/244* (2013.01); *B29C 66/322* (2013.01); *B29C 66/53462* (2013.01); *B29C 66/934* (2013.01); *G01F 1/684* (2013.01); *G01F 5/00* (2013.01); *B29C 65/1612* (2013.01); *B29C 65/1677* (2013.01); *B29C 66/124* (2013.01); *B29C 66/71* (2013.01); *B29C 66/7212* (2013.01); *B29C 66/73772* (2013.01); *B29C 66/73776* (2013.01); *B29C 66/73921* (2013.01); *B29C 66/73941* (2013.01); *B29K 2105/0079* (2013.01); *B29L 2031/3481* (2013.01)

(56) References Cited

U.S. PATENT DOCUMENTS

2009/0000366 A1* 1/2009 Uramachi ............ G01F 15/185
  73/114.32
2011/0017394 A1* 1/2011 Grgac .................. B29C 65/344
  156/273.9

FOREIGN PATENT DOCUMENTS

| JP | 2007-210165 A | 8/2007 |
| JP | 2010-162587 A | 7/2010 |
| JP | 2010-214730 A | 9/2010 |
| JP | 2011-143596 A | 7/2011 |
| JP | 2011-240586 A | 12/2011 |

OTHER PUBLICATIONS

International Search Report (PCT/ISA/210) dated Mar. 25, 2014 with English translation (five pages).

* cited by examiner

FLOW SENSOR

TECHNICAL FIELD

The present invention relates to a flow sensor and a manufacturing method therefor. Further, the present invention relates to a joining structure of both plastics using laser welding and a method therefor.

BACKGROUND ART

For example, in JP-A-11-258019 (Patent Literature 1), disclosed is that in measuring instruments such as a thermal type flow sensor, a housing that has measuring devices built-in and a cover that covers them are welded without the use of an adhesive agent. Further, for example, in JP-A-2007-210165 (Patent Literature 2), disclosed is a technology for welding a housing and a cover by laser. In JP-A-2010-162587 (Patent Literature 3), disclosed is that when another member is fixed to electronic equipment or a flow sensor by a thermal fusion bonding process including laser, a flow passage holding body is provided with heat insulation parts in order to suppress an effect of heat onto a circuit board or the like.

CITATION LIST

Patent Literature

PATENT LITERATURE 1: JP-A-11-258019
PATENT LITERATURE 2: JP-A-2007-210165
PATENT LITERATURE 3: JP-A-2010-162587

SUMMARY OF INVENTION

Technical Problem

A flow sensor includes a flow rate detection unit and a temperature detection unit, and they are arranged on a housing (chassis). Further, various electronic components are mounted in a circuit chamber provided in the housing. In order to prevent short circuit, corrosion, or the like of a wiring unit etc, the housing and a cover need to be sealed. As a method for directly connect the cover and the housing precisely without giving damages to electronic components, a laser welding method is used. However, in a conventional laser welding method typified by prior art documents, welding is uniformly made in all welding spots to secure airtightness, and therefore it is difficult to secure high productivity. In view of the foregoing, it is an object of the present invention to provide a flow sensor that improves productivity and implements a low cost while maintaining high quality and high reliability.

Solution to Problem

To solve the above problems, for example, a configuration described in a scope of claims is adopted. The present invention includes a method for solving the above problems in plurality, and one example is taken. A flow sensor includes a housing, a cover, a circuit chamber that is sealed between the housing and the cover and has electronic components and wiring parts built-in, and a sub-passage part through which a fluid to be detected passes, wherein a welding width of a first welded part forming the circuit chamber is greater than a welding width of a part of a second welded part forming the sub-passage part.

Advantageous Effects of Invention

By an adoption of the present invention, provided is a low-cost flow sensor that has high quality and high reliability and is capable of performing laser welding at high speed while securing high performance as the flow sensor by securing quality or reliability of a welded part requiring sealing.

DESCRIPTION OF EMBODIMENTS

First Embodiment

Figure 1:
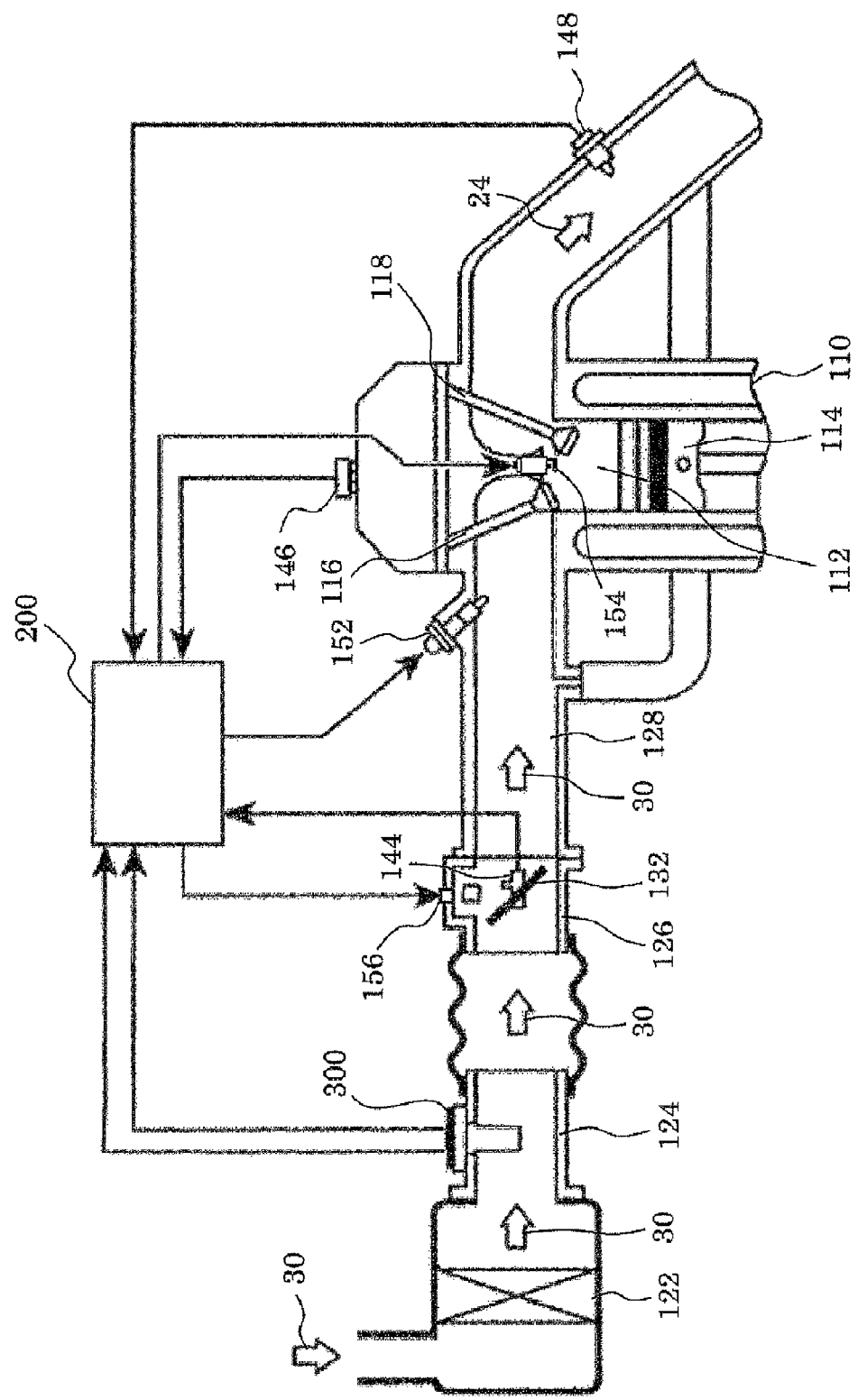
FIG. 1 An overall view of an internal combustion engine control system using a flow sensor of the present invention.

An internal combustion engine control system including a flow sensor of the present invention will be described with reference to FIG. 1. Based on operations of an internal combustion engine 110 including an engine cylinder 112 and an engine piston 114, air is inhaled and it is gas to be measured 30 that is measured by a thermal type flow sensor 300 of the present invention. The inhaled gas to be measured 30 passes through an air cleaner 122 and is guided to a combustion chamber of the engine cylinder 112 via a main passage 124, a throttle body 126, and an intake manifold 128. Based on a flow rate measured by the thermal type flow sensor 300, fuel is supplied from a fuel injection valve 152 and is guided to the combustion chamber in a state of an air-fuel mixture together with the gas to be measured 30. The present embodiment will be described by using a system in which fuel is injected to an intake port of the internal combustion engine as illustrated in FIG. 1, namely, a so-called engine of a premix type. The thermal type flow sensor 300 of the present invention is not limited thereto, and is applicable also to a direct injection type in which fuel is directly injected to each combustion chamber.

The fuel and air guided to the combustion chamber form a mixing state of the fuel and air. By spark ignition of a spark plug 154, the fuel and air burn explosively and generate mechanical energy. The gas after the combustion is guided to an exhaust pipe from an exhaust valve 118 and is exhausted as exhaust air 24 to an outside of a vehicle from the exhaust pipe. An amount of intake air guided to the combustion chamber is controlled by a throttle valve 132 in conjunction with an accelerator pedal. The amount of fuel to be supplied is controlled based on the intake air amount, and a driver controls the opening degree of the throttle valve 132 to control the intake air amount. The process permits mechanical energy generated by the internal combustion engine to be controlled.

The flow rate and the temperature of the gas to be measured 30 that is taken from the air cleaner 122 and flows through the main passage 124 is measured by the thermal type flow sensor 300, and measured values thereof are input to a control device 200. Further, an output from a throttle angle sensor 144 that measures the opening degree of the throttle valve 132 is input to the control device 200. Further, positions and states of the engine piston 114, an intake valve 116, and the exhaust valve 118 are input to the control device 200. In addition, to measure a rotating speed of the internal combustion engine, an output from a rotation angle sensor 146 is input to the control device 200. To measure a state of a mixing ratio between the amount of fuel and the amount of air based on a state of the exhaust air 24, an output from an oxygen sensor 148 is input to the control device 200.

The control device 200 calculates a fuel injection amount and an ignition timing based on the intake air amount being an output from the thermal type flow sensor 300 and the rotating speed of the internal combustion engine. Based on the calculation results, the amount of fuel supplied from the fuel injection valve 152 and the ignition timing in which ignition is performed by the spark plug 154 are controlled. Further, the amount of fuel to be supplied and the ignition timing are minutely controlled in practice based on a changed state of the intake air temperature and the throttle angle measured by the thermal type flow sensor 300, a changed state of an engine rotating speed, and a state of an air-fuel ratio measured by the oxygen sensor 148. In an idle operating state of the internal combustion engine, the control device 200 further controls the amount of air that bypasses the throttle valve 132 by using an idle air control valve 156, and controls a rotating speed of the internal combustion engine in the idle operating state.

Figure 2A:
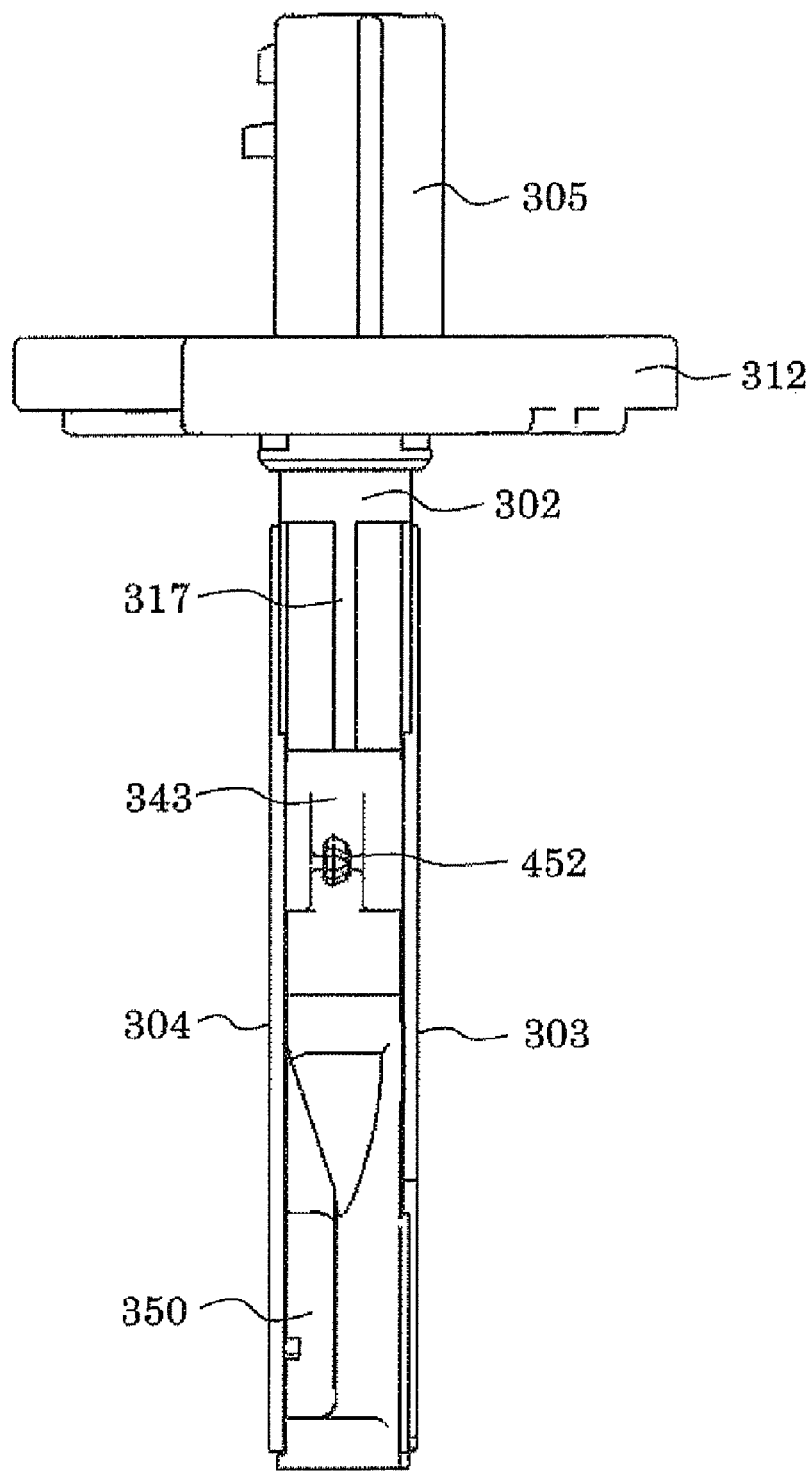
FIG. 2(A) A left side view illustrating an appearance of the flow sensor.
Figure 2B:
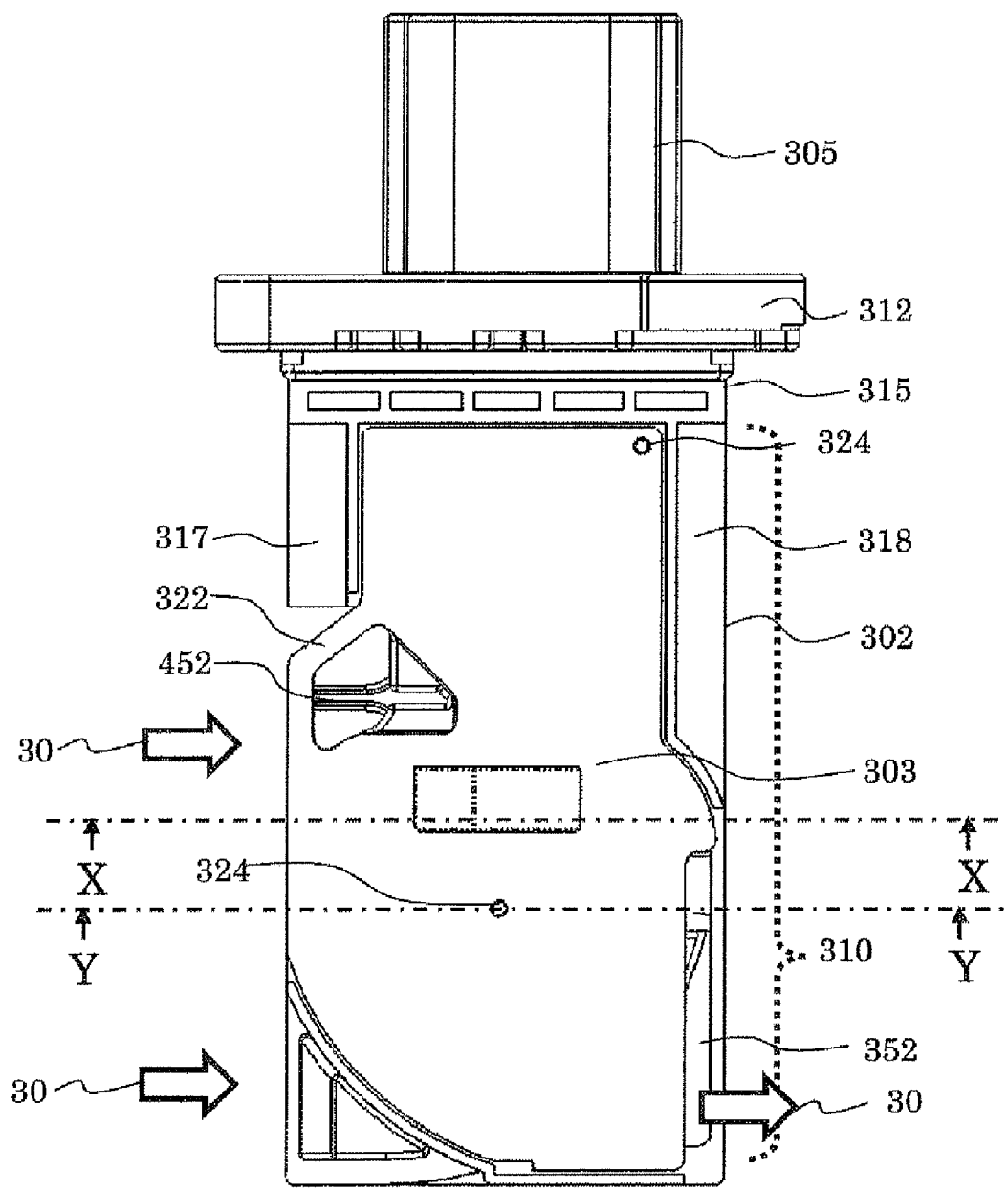
FIG. 2(B) A front view illustrating an appearance of the flow sensor.
Figure 3A:
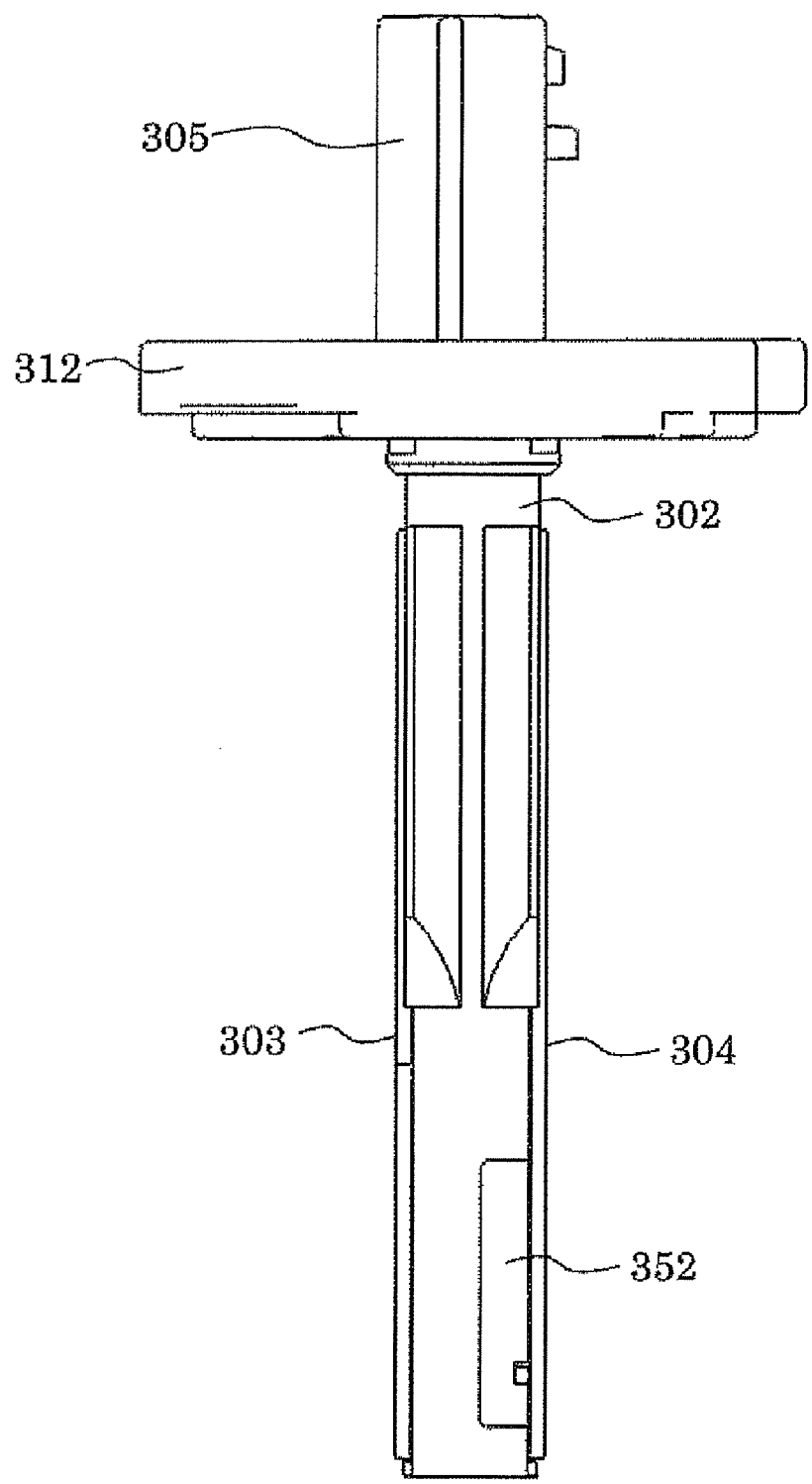
FIG. 3(A) A right side view illustrating an appearance of the flow sensor.
Figure 3B:
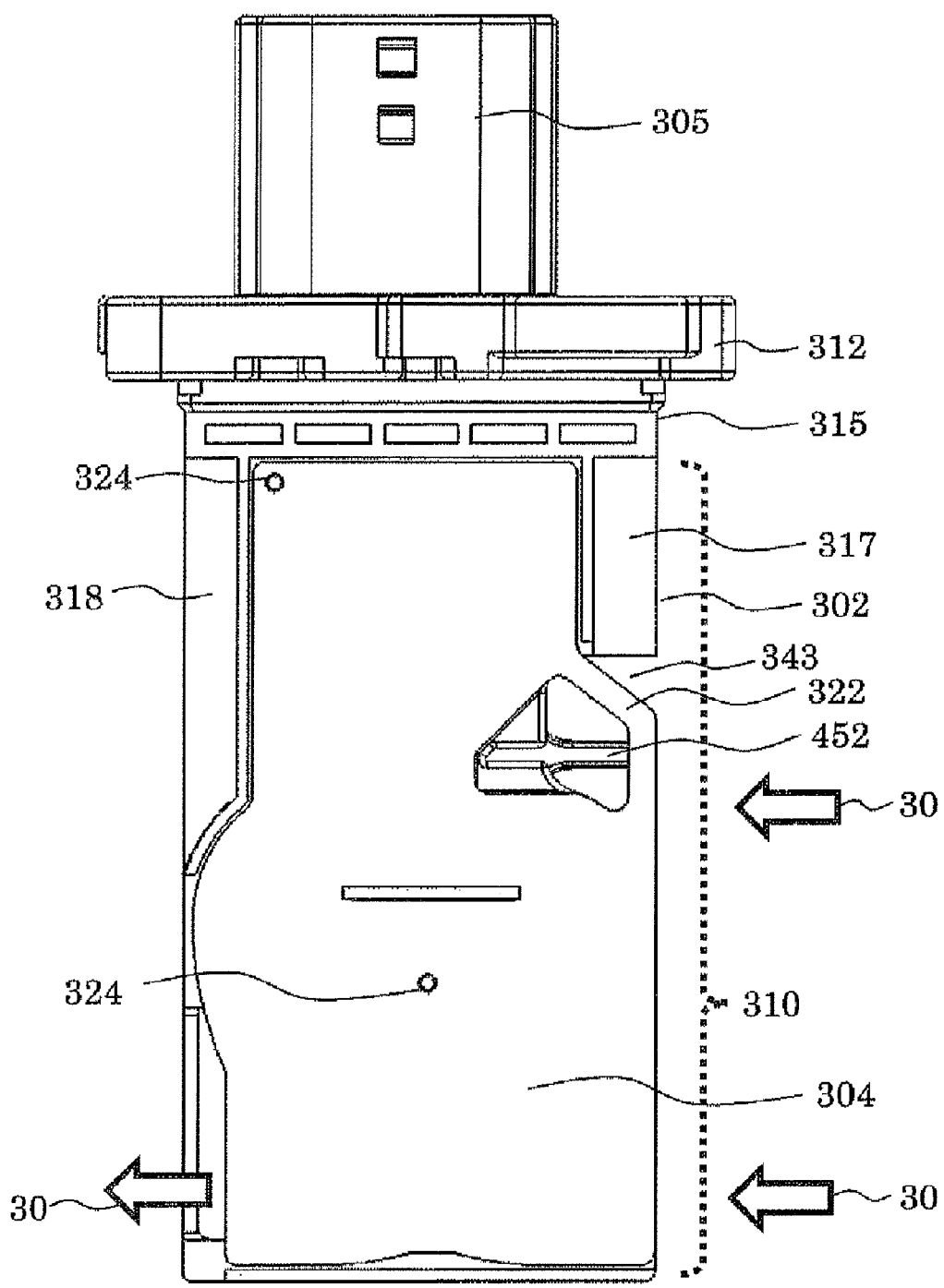
FIG. 3(B) A back view illustrating an appearance of the flow sensor.

Next, an appearance structure of the thermal type flow sensor 300 will be described with reference to FIGS. 2 and 3. FIG. 2(A), FIG. 2(B), FIG. 3(A), and FIG. 3(B) illustrate a left side view, a front view, a right side view, and a back view of the thermal type flow sensor 300, respectively.

The thermal type flow sensor 300 includes a housing 302, a front cover 303, and a rear cover 304. The housing 302 includes a flange 312 for fixing the thermal type flow sensor 300 on the main passage 124, an external connection part 305 having an external terminal for providing electrical connection with an external device, and a measuring unit 310 that measures a flow rate or the like. In the measuring unit 310, a sub-passage groove for making a sub-passage is provided. Further, as illustrated in FIGS. 4 and 5, in the measuring unit 310, provided is a circuit package 400 including a flow rate detection unit that measures a flow rate of the gas to be measured 30 flowing through the main passage 124 and a temperature detection unit 452 that measures a temperature of the gas to be measured 30 flowing through the main passage 124.

Figure 4A:
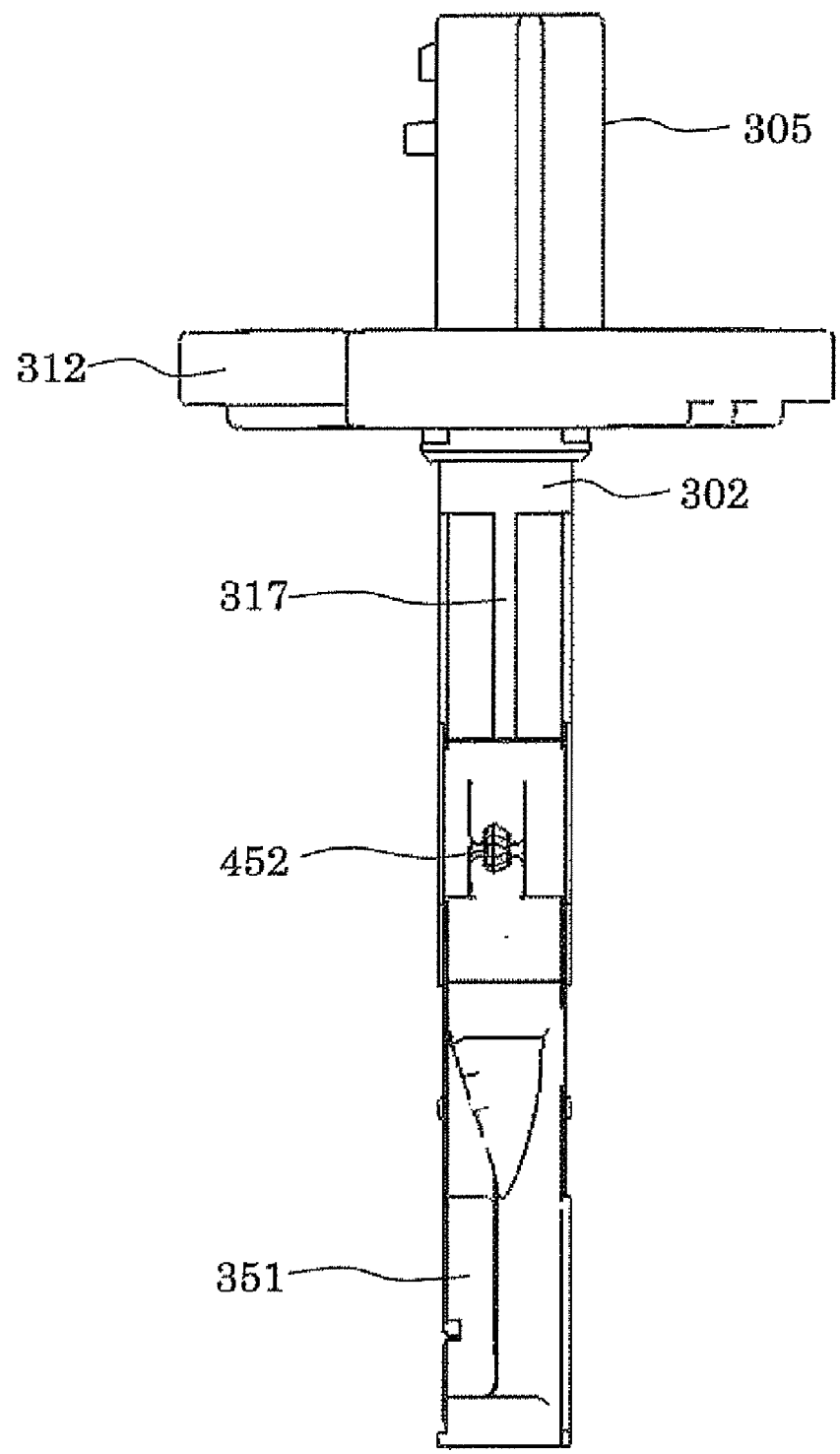
FIG. 4(A) A left side view of a housing of the flow sensor.
Figure 4B:
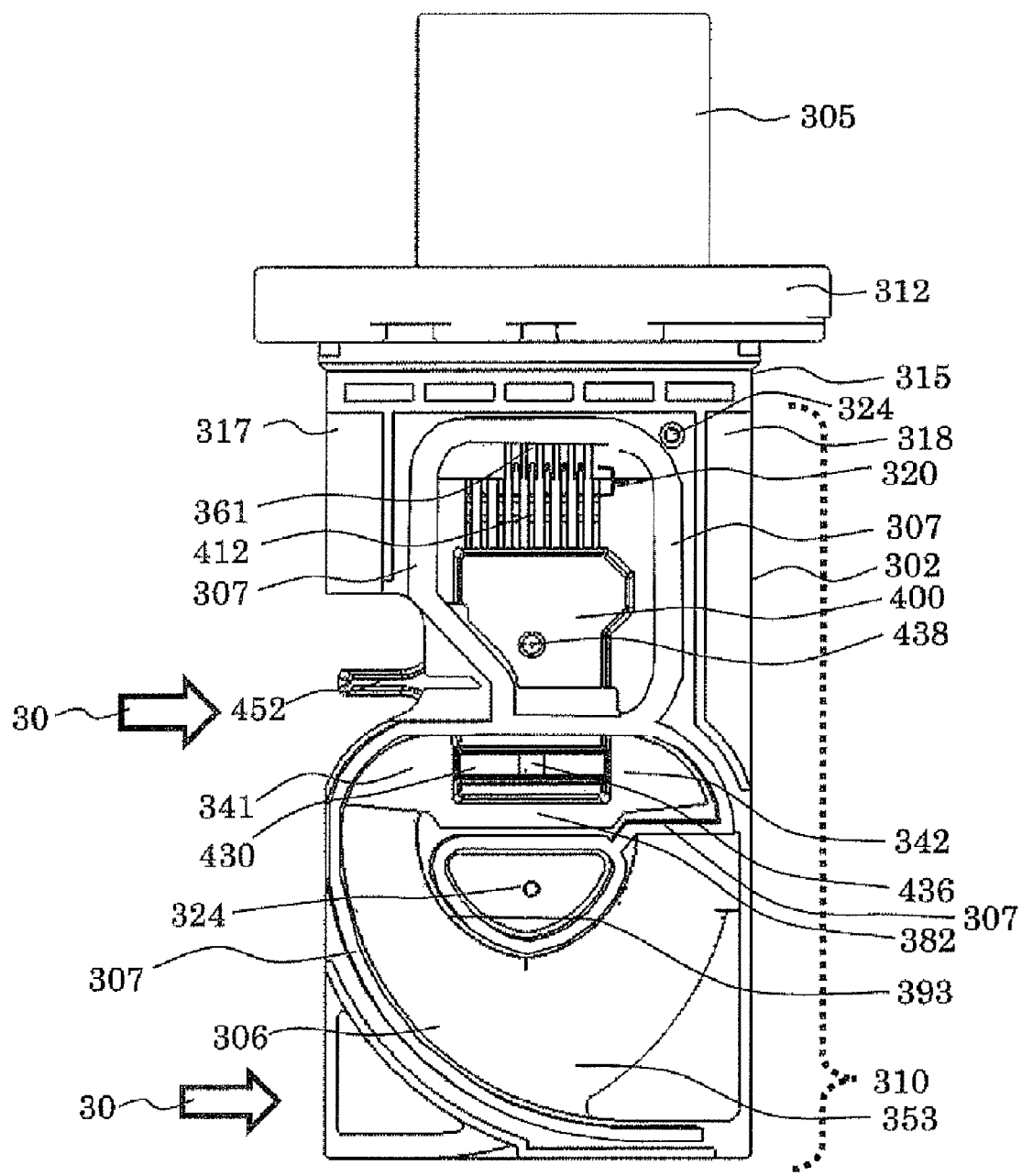
FIG. 4(B) A front view of the housing of the flow sensor.
Figure 5A:
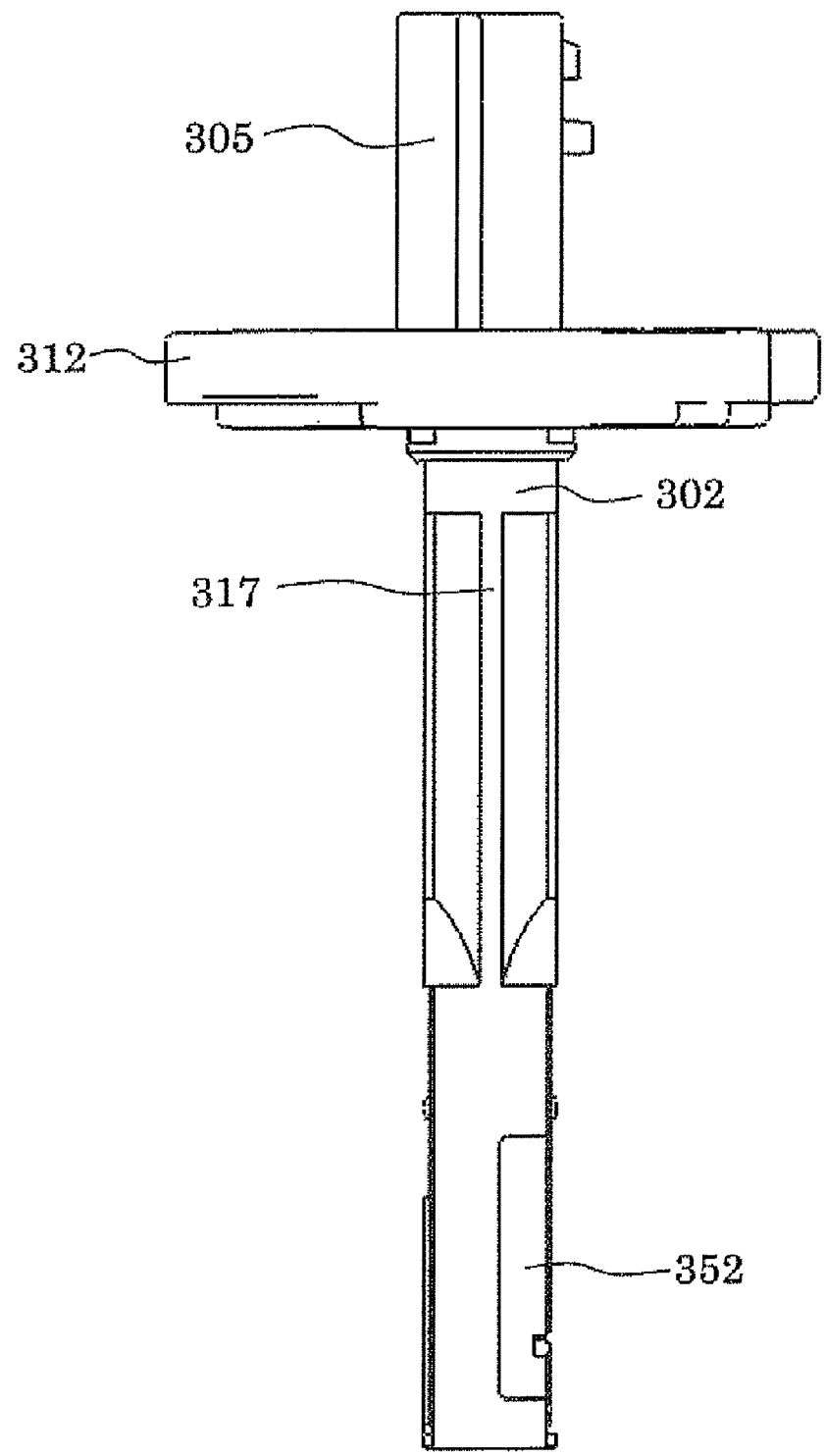
FIG. 5(A) A right side view of the housing of the flow sensor.
Figure 5B:
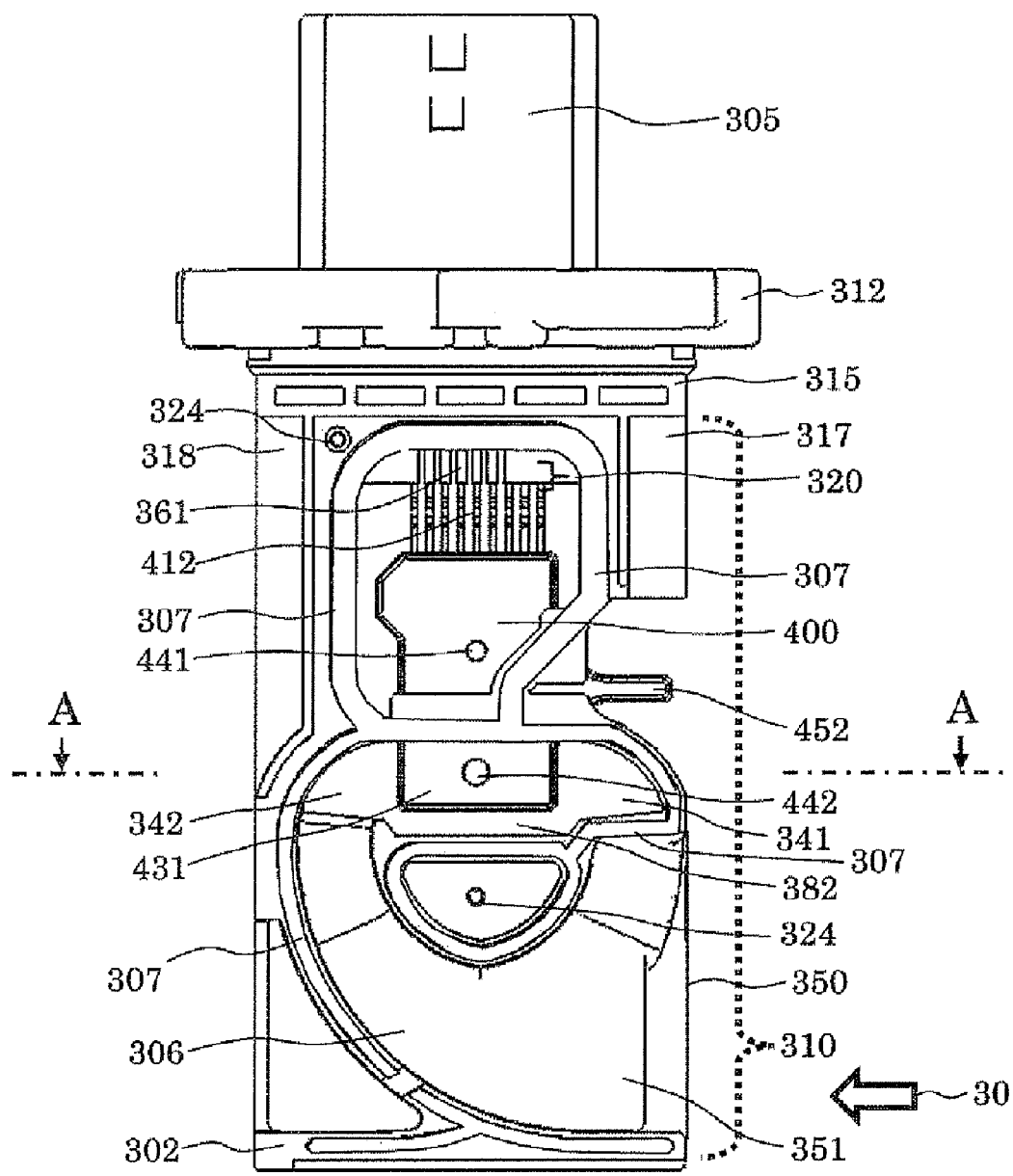
FIG. 5(B) A back view of the housing of the flow sensor.

Next, an internal structure of the thermal type flow sensor 300 will be described with reference to FIGS. 4 and 5 illustrating states of the housing 302 from which the front cover 303 and the rear cover 304 are detached. FIG. 4(A) is a left side view of the housing of the flow sensor, and FIG. 4(B) is a front view thereof. FIG. 5(A) is a right side view of the housing of the flow sensor, and FIG. 5(B) is a back view thereof. In FIGS. 4(A) and 4(B), the sub-passage groove 306 for molding the sub-passage is provided on the housing 302. A projecting part 307 in which the covers are disposed on a front surface and a rear surface of the housing 302 and that is disposed near the sub-passage groove 306, the front cover 303, and the rear cover 304 are welded by laser to thereby complete the sub-passage.

In FIGS. 5(A) and 5(B), a part of the gas to be measured 30 flowing through the main passage 124 is taken in the rear sub-passage groove 306 from an inlet groove 351 for molding an inlet 350 and flows through the rear sub-passage groove 306. The rear sub-passage groove 306 has a shape in which the groove thereof is deeper as advancing through the groove more. As flowing through the groove more, the gas to be measured 30 moves more gradually to a direction of the front side. Particularly, the rear sub-passage groove 306 is provided with a steep slope part that is drastically deepened in an upstream part 342 of the circuit package 400. A part of air in which mass is small moves along the steep slope part and, in the upstream part 342 of the circuit package 400, the air flows through a measuring flow passage surface 430 illustrated in FIG. 4(B). On the other hand, foreign materials in which mass is large move along a rear measuring flow passage surface 431 illustrated in FIG. 5(B) since it is difficult to rapidly change a course because of an inertia force. Thereafter, the foreign materials move along a downstream part 341 of the circuit package 400 and flow through the measuring flow passage surface 430 illustrated in FIG. 4(B). With that, the appearance structure and the internal structure of the thermal type flow sensor 300 are described.

Next, a laser welding method for the housing and the covers according to the present invention will be described. The laser welding method is a method for irradiating laser, in a state in which a light-transmitting resin and a light-absorbing resin are overlapped, through the light-transmitting resin, melting a portion in which the light-absorbing resin has contact with the light-transmitting resin, and further melting the light-transmitting resin by heat transmitted from the light-absorbing resin to be brought into contact with the light-absorbing resin. Because of the above-described welding principle, a natural material containing no coloring agent is preferably used as the light-transmitting resin for the covers 303 and 304. On the other hand, preferably, into materials used as the light-absorbing resin for the housing 302, carbon black is contained and the materials are colored into black. In addition, for the housing 302 and the covers 303 and 304 of the present invention, polybutylene terephthalate (PBT), polyphenylene sulfide (PPS), nylon 6 (PA6), nylon 66 (PA66), nylon 6T (PA6T), or the like being crystalline resins having high heat resistance is assumed.

Further, in the thermal type flow sensor 300 of the present invention, high dimensional precision and dimensional stability are particularly required for the housing 302 side, and therefore glass materials of approximately 20 to 40% are added in many cases. However, laser transmission tends to be deteriorated by the addition of the glass materials. Therefore, an addition rate of glass fiber of thermoplastic resins composing the housing 302 is preferably equal to or greater than that of the thermoplastic resins composing the covers 303 and 304.

Further, in crystalline thermoplastic resins, as a tool temperature during molding is lower, crystallinity is lower and a transmission factor is higher. Therefore, the crystallinity of the thermoplastic resins composing the housing 302 is preferably equal to or greater than that of the thermoplastic resins composing the covers 303 and 304.

Further, from the standpoint of the dimensional precision, not only the glass fiber to be added but also an alloy system containing amorphous resins is preferably used as resin materials of the housing 302.

As a light source used for the laser welding, laser having wavelengths of light in an infrared region including semiconductor laser, YAG laser, and fiber laser is effective in terms of costs. Further, laser having other wavelengths may be used in accordance with the absorption of resins. Further, an intensity distribution of laser light sources can be converted to various intensity distributions based on a lens belonging to Gaussian type, top-hat type, ring type, or the like. However, when the top hat type or the ring type is used, the welding can be uniformly made. When laser is irradiated, a laser light source or a product may be physically moved to be welded on a stage, or laser light itself may be controlled and irradiated using a galvanometer mirror.

Next, the laser welding method of the present invention will be described. First, the housing 302 is set at a predetermined position, and the covers 303 and 304 are arranged on the housing 302 with high precision. Thereafter, the covers 303 and 304 and the housing 302 are pressurized by transparent pressurizing materials such as glass or acrylate resin. Laser welding is made around a circuit chamber in a state in which the pressurized state is maintained. Further, the laser welding is made so that the sub-passage is formed.

Figure 6:
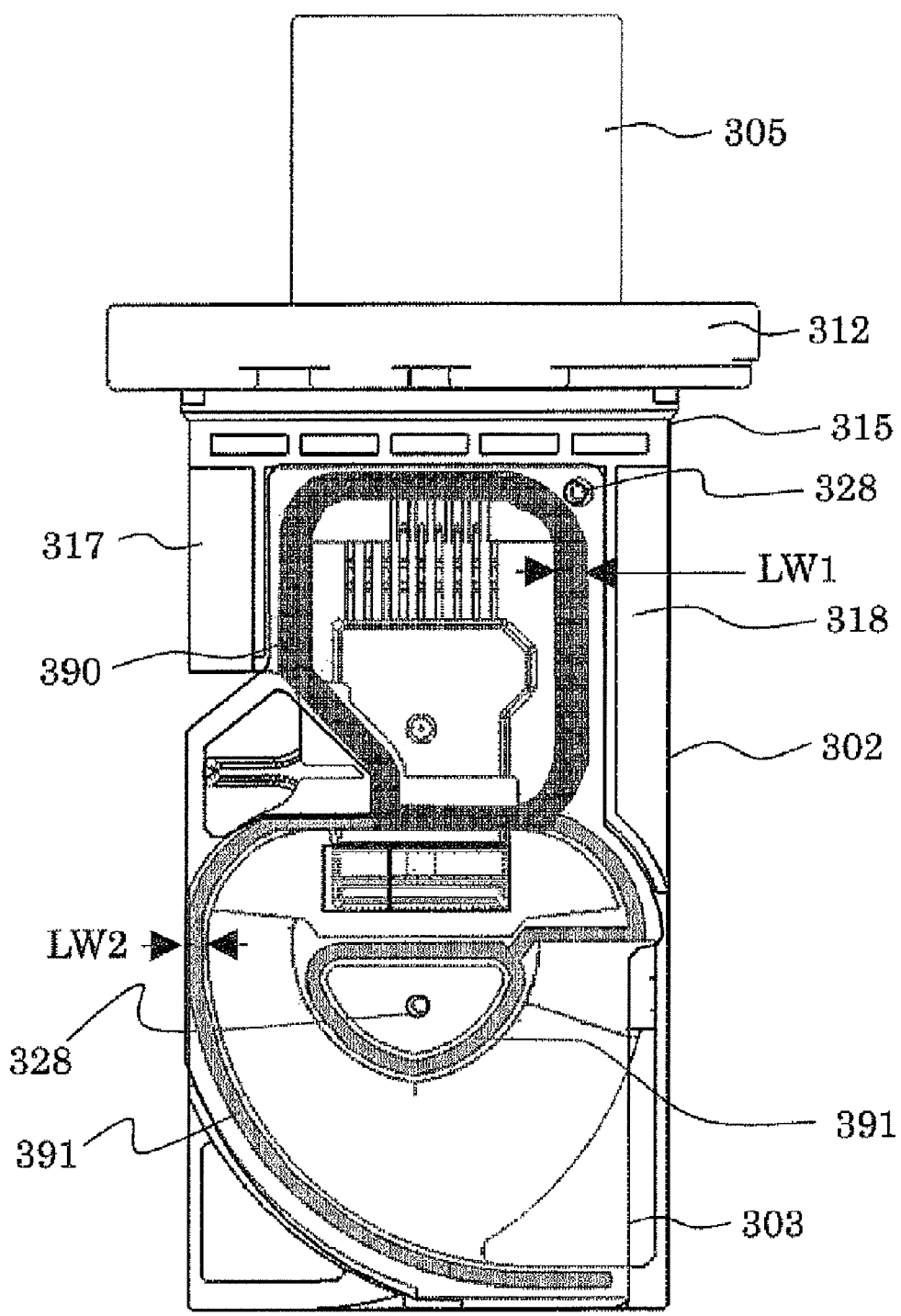
FIG. 6 A front view of the housing of the flow sensor according to a first embodiment.
Figure 7:
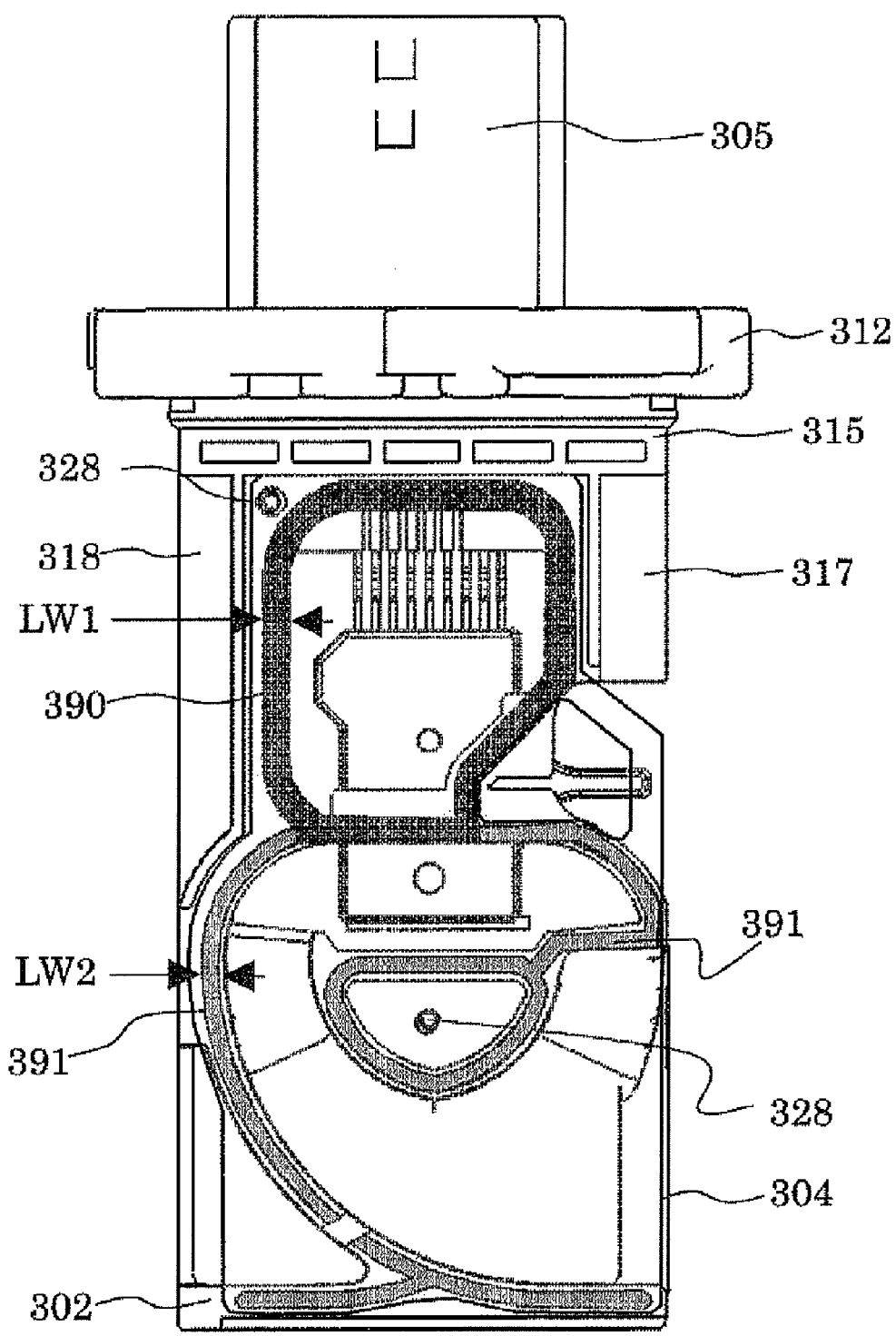
FIG. 7 A back view of the housing of the flow sensor according to the first embodiment.
Figure 8A:
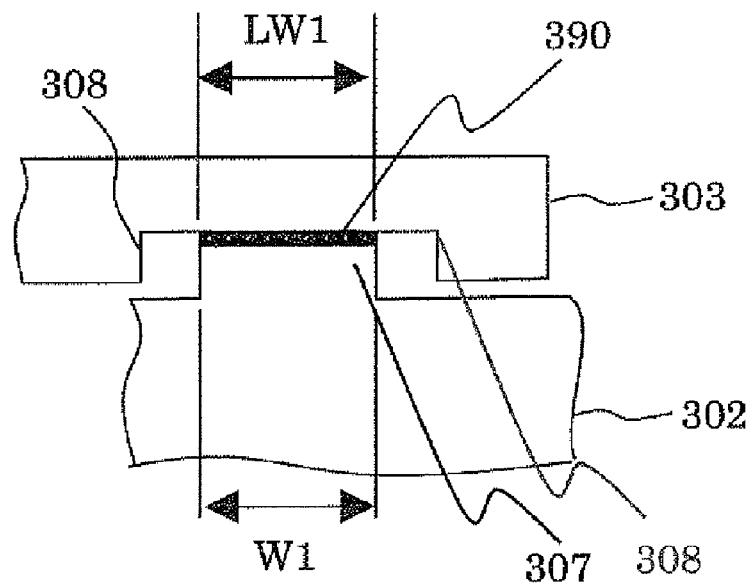
FIG. 8(A) A cross-section view of a welded part of a circuit chamber according to the first embodiment.
Figure 8B:
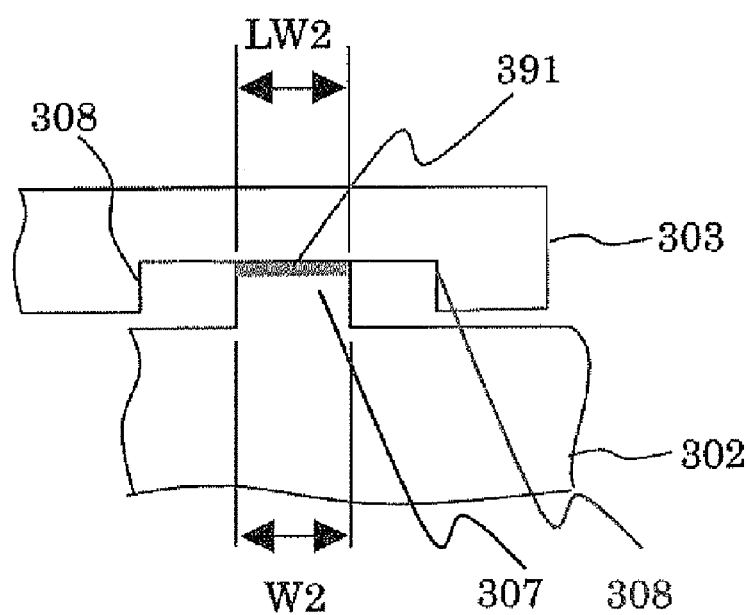
FIG. 8(B) A cross-section view of the welded part of a sub-passage part according to the first embodiment.

Next, a laser welding structure according to the first embodiment of the present invention will be described. FIGS. 6 and 7 are examples illustrating the thermal type flow sensor 300 and the laser welding structure of the present embodiment, and illustrate a front view and a back view of the thermal type flow sensor 300. FIG. 8(A) is a cross-section view of a welded part 390 of the circuit chamber, and FIG. 8(B) is a cross-section view of a welded part 391 of the sub-passage part. The present embodiment is characterized in that a welding width LW1 of the welded part 390 of the housing 302 and the covers 303 and 304 that are used to seal the circuit chamber is made to be greater than a welding width LW2 of the welded part 391 of the housing 302 and the covers 303 and 304 that form the sub-passage part.

In the circuit chamber of the thermal type flow sensor 300, formed is wiring such as a connection terminal 412 of the circuit package 400, an external terminal inner edge 361 of an external connection part 305, and a terminal connection part 320 being their connection parts. For the purpose, in order to prevent a short circuit or corrosion, for example, airtightness needs to be secured so that corrosive gas or steam is not transmitted, and therefore the circuit chamber is generally sealed. On the other hand, according to investigations of the inventor, it is confirmed that even if the sub-passage part has a local leakage portion (connection parts between air bubble remaining parts of the welding) with approximately several tens of µm, characteristics of the thermal type flow sensor 300 are not reduced. Further, to improve precision, the thermal type flow sensor 300 needs to take in a fluid to be measured as much as possible. As compared to the circuit chamber, the sub-passage part grows in size and also a length of the welded part becomes longer. That is, in manufacturing of the thermal type flow sensor 300, the sub-passage part is greater than the circuit chamber in a rate occupied by the welding time.

Based on the above-described investigations, the inventor has further studied a method for reducing a production time (tact) of the whole thermal type flow sensor while satisfying welding quality required for each of the circuit chamber and the sub-passage part.

Specifically, the inventor has set a resin used for the covers 303 and 304 and the housing 302 to PBT, and has studied a relationship between a laser scanning speed and a projecting width of the housing on which laser is irradiated. The welding quality in the case in which laser power is set under the same conditions and a width of the projection part 307 formed in the housing 302 is reduced to half is the same as that in the case in which the projecting width is not changed but the laser scanning speed is set to 2.5 times as fast as before. This welding quality is ideal quality in which no air bubble remains in the welded part.

This is caused by the fact that as a width of the projection part 307 is smaller, thermal diffusion can be more suppressed. Further, the inventor has found that an effect of reducing a width makes a large contribution to an improvement in the speed also in a combination of material systems in which thermal conductivity is as low as approximately 0.2 W/mK like PBT.

Further, even by increasing laser power, the same speed improvement can be realized. However, in a crystalline material system in which there is lots of diffusion like PBT, since transmittance is relatively low, when the laser power is largely increased, damages on a surface increase. These are new problems that pressurizing materials are damaged or yield of products is deteriorated. Further, as the laser power increases more, costs as facilities also increase more.

To solve the problems, in the first embodiment of the present invention, a width W1 of the projecting part 307 composing the circuit chamber of the housing 302 is made to be greater than a width W2 of the projecting part 307 composing the sub-passage part of the housing 302. Further, the circuit chamber is welded at relatively low speed and the sub-passage part is welded at relatively high speed. As a result, the welding width LW1 of the welded part 390 of the housing 302 and the covers 303 and 304 is made to be greater than the welding width LW2 of the welded part 391 of the housing 302 and the covers 303 and 304 that form the sub-passage part. Thereby, sufficient sealing can be performed in the circuit chamber in which high airtightness is required, and quality or reliability can be secured. Further, the laser welding time of the sub-passage part can be shortened in which the airtightness is not required as much as the circuit chamber and that is greater than the circuit chamber in the rate occupied by the laser welding time, and a manufacturing tact can be shortened. In the case in which W1 and W2 cannot be uniformed in terms of design of the thermal type flow sensor 300, it is sufficient to just satisfy the relationship in respective average widths. To cite one example, preferably, an average of the widths W1 of the projecting part 307 formed in the housing 302 of the circuit chamber is set to 1.5 to 2.5 mm, and an average of the widths W2 of the projecting part 307 formed in the housing 302 of the sub-passage part is set to 0.5 to 1.5 mm. Further, preferably, a concave part 308 for a burr accumulation part is provided in the covers 303 and 304, and a thickness of the covers 303 and 304 corresponding to the laser welded part is set to 0.8 to 1.0 mm in consideration of the transmittance or flow characteristics of resins. From the standpoint of the quality or the characteristics, the welding width LW1 unnecessarily corresponds to the width W1 of the projecting part 307 and the welding width LW2 unnecessarily corresponds to the width W2 of the projecting part 307. Particularly, in consideration of the after-mentioned burr or the like, the welding width LW2 may be smaller than the width W2 of the projecting part 307.

Further, the thermal type flow sensor 300 of the present invention has a common portion of the circuit chamber and the sub-passage part. Since the common portion composes a part of the circuit chamber, high airtightness is required, and therefore conditions of the common portion are preferably set to the same as those of the circuit chamber.

Second Embodiment

Figure 9A:
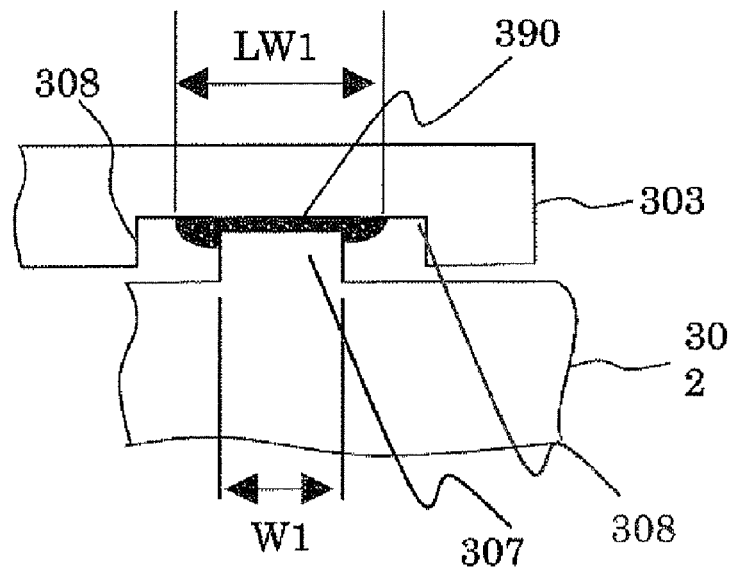
FIG. 9(A) A cross-section view of the welded part of the circuit chamber according to a second embodiment.
Figure 9B:
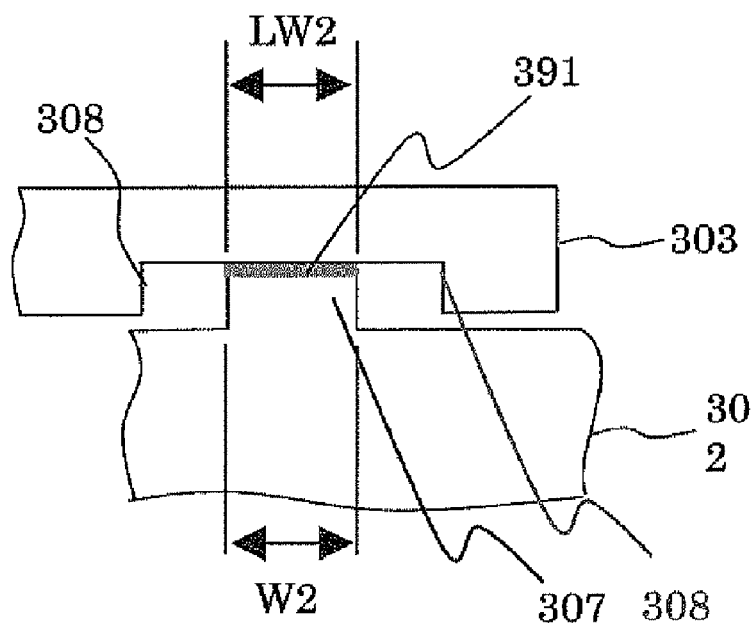
FIG. 9(B) A cross-section view of the welded part of the sub-passage part according to the second embodiment.

A second embodiment of the present invention will be described with reference to FIGS. 9(A) and 9(B). FIG. 9(A) is a cross-section view of the welded part 390 of the circuit chamber, and FIG. 9(B) is a cross-section view of the welded part 391 of the sub-passage part. In the present embodiment, the welding is made at low speed in the circuit chamber in which a welding length is short, and the welding is made at high speed in the sub-passage part in which the welding length is long. Thereby, a burr is formed in the welded part composing the circuit chamber, and the average welding width LW1 of the circuit chamber including the burr is made to be greater than the average welding width LW2 of the sub-passage part. A burr generated during the welding exerts an effect on an improvement in the welding strength and an improvement in the reliability due to stress relaxation. As a result, high productivity can be secured while securing the reliability in the circuit chamber.

In the common portion of the sub-passage part and the circuit chamber, the required airtightness for the sub-passage part is the same as that for the circuit chamber, and therefore the laser welding may be made under the same conditions as those of the circuit chamber. Further, the burr pushed up from the concave part 308 of the covers 303 and 304 exerts a negative effect on the sub-passage part. Therefore, it is necessary to set a depth of the concave part 308 so that the burr is necessarily stored in the concave parts 308 of the covers 303 and 304, and to precisely adjust also the laser scanning speed. The burr may be prevented from being generated only in the common portion. Further, laser light is made to be closer to the circuit chamber side, and thereby the burr may be formed only in the circuit chamber.

Third Embodiment

Figure 10:
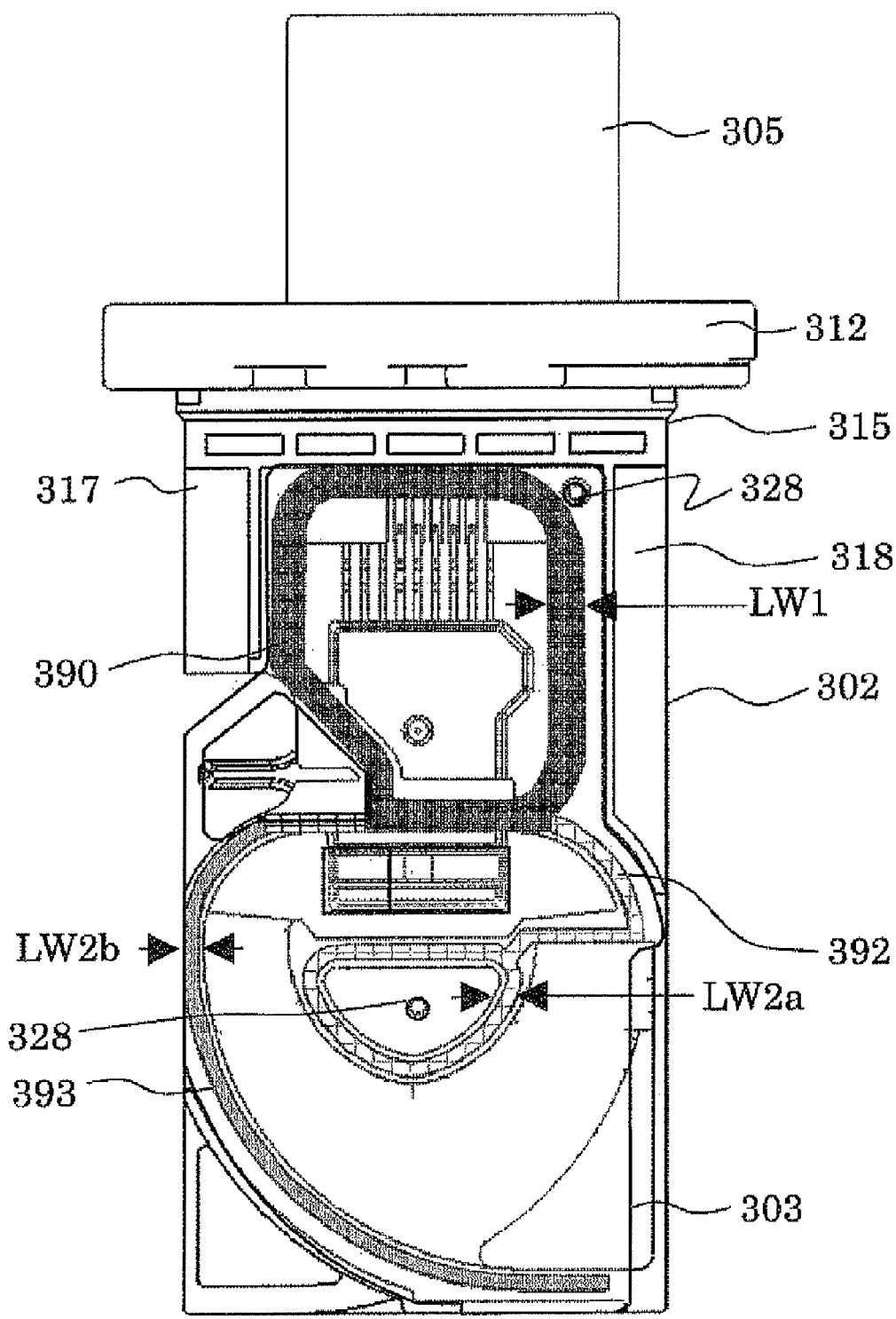
FIG. 10 A front view of the housing of the flow sensor according to a third embodiment.
Figure 11:
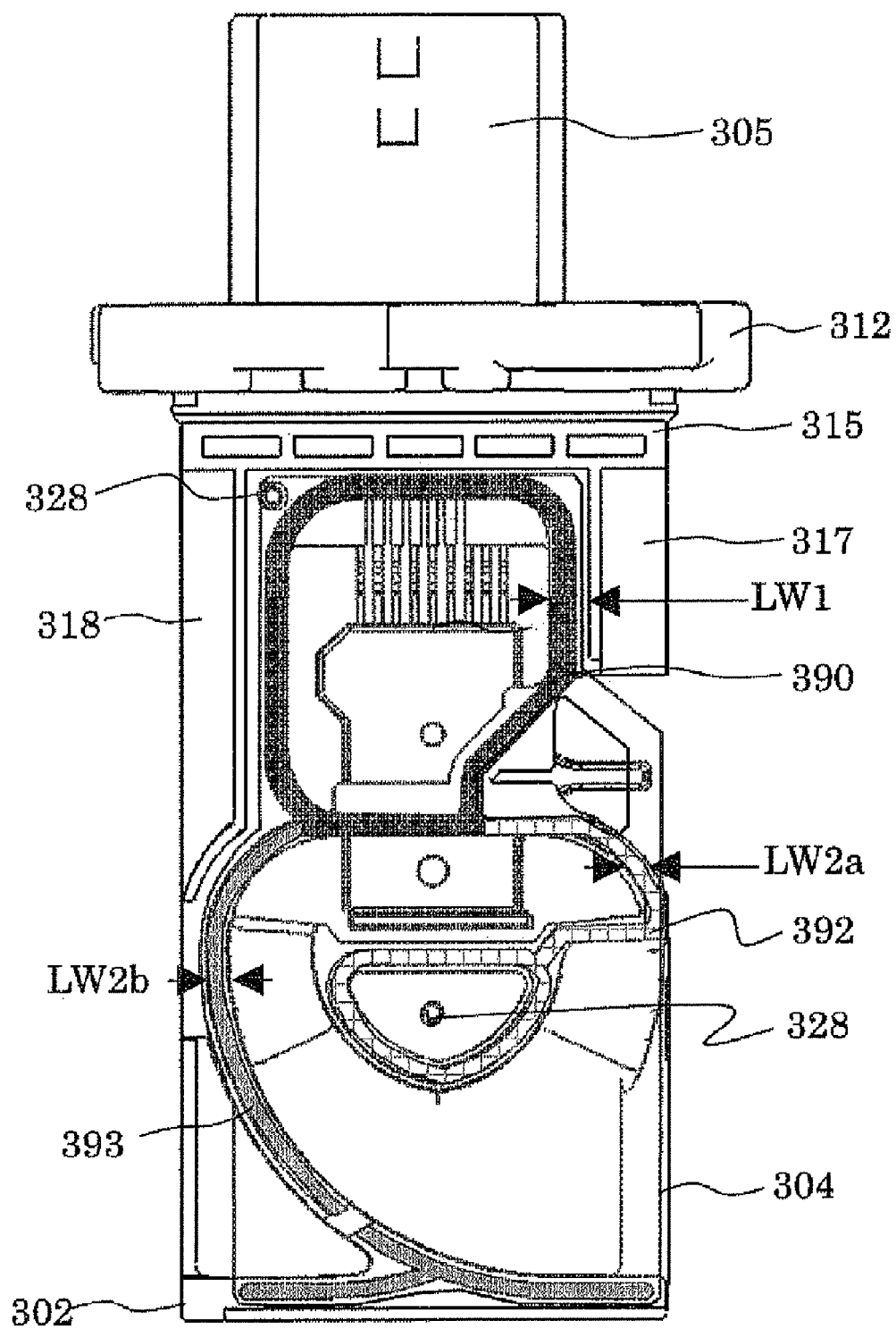
FIG. 11 A back view of the housing of the flow sensor according to the third embodiment.

A third embodiment of the present invention will be described with reference to FIGS. 10 and 11. FIG. 10 is a front view of the housing of the thermal type flow sensor according to the present embodiment, and FIG. 11 is a back view of the housing of the thermal type flow sensor according to the present embodiment. In a plurality of the thermal type flow sensors 300, a flow velocity distribution of an inner peripheral-side sub-passage part is faster than that of an outer peripheral-side sub-passage part. Therefore, the inner peripheral side is greater than the outer peripheral side in characteristic degradation due to a deficit of the welded part. Accordingly, LW1>LW2a>LW2b holds in a relationship between the welding width (LW1) of the welded part 390 of the circuit chamber, the welding width (LW2a) of the welded part 392 of the inner peripheral-side sub-passage part including the vicinity of a sensor device, and the welding width (LW2b) of the welded part 393 of the outer peripheral-side sub-passage part. As a result, by securing the productivity, the characteristic degradation of the sub-passage part can be suppressed.

In addition, W1≥W2a≥W2b holds in a relationship between the welding width (W1) of the projecting part 307 composing the circuit chamber of the housing 302, the welding width (W2a) of the projecting part 307 formed in the housing 302 of the inner peripheral-side sub-passage part including the vicinity of the sensor device, and the welding width (W2b) of the projecting part 307 formed in the housing 302 of the outer peripheral-side sub-passage part. In the same manner as in the second embodiment, it is sufficient to just satisfy the relationship between the welding widths including the burr.

Fourth Embodiment

Figure 12:
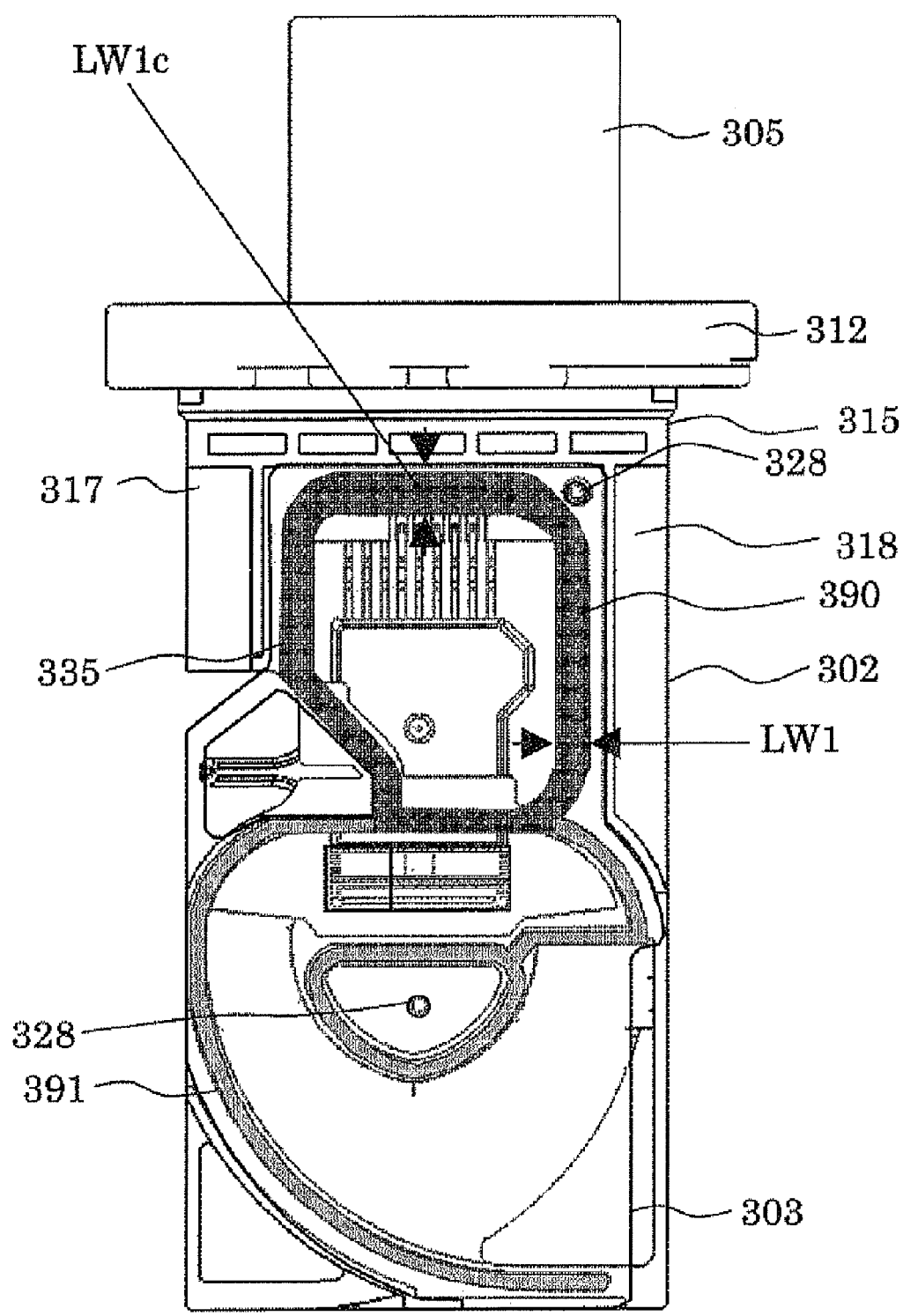
FIG. 12 A front view of the housing of the flow sensor according to a fourth embodiment.

A fourth embodiment of the present invention will be described with reference to FIG. 12. FIG. 12 is a front view of the housing of the thermal type flow sensor according to the present embodiment. The present embodiment is characterized in that only the welding width LW1c of the welded part 390 on the flange 312 side of the circuit chamber is made to be greater than the welding width LW1 of the other welded part 390 of the circuit chamber.

Normally, in the case in which the laser welding is made, pressurization is performed by pressurizing materials. However, when a gap is approximately 50 μm, it can be filled by using melting and thermal expansion of the housing 302 due to the laser irradiation. However, in the case in which deformation of the covers 303 and 304 does not follow a shape of the housing 302 or the pressurizing material itself inclines, the covers 303 and 304 and the housing 302 may have contact with each other only in one portion and a gap may be produced in the other portion. Particularly, there is a high possibility that gaps are produced at end portions in a longitudinal direction of the housing 302. Conventionally, in the case in which contact is made in the outer peripheral-side sub-passage part of the housing 302, a large gap may be produced in the circuit chamber on the flange 312 side. To deal with the problem, only the welding width LW1c of the welded part on the flange 312 side of the circuit chamber is made to be greater than the welding width LW1 of the other portion. As a result, even if a part of the welded part on the flange 312 side of the circuit chamber is separated, an effect of the separation can be reduced. Further, the welding width LW1c of the welded part is widened, and thereby an effect of stress concentration can be reduced.

Further, there is a problem that there is a high flange in height and thereby a pressurized state is not stabilized. However, adoption of the above configuration permits reliability to be improved.

Fifth Embodiment

Figure 13:
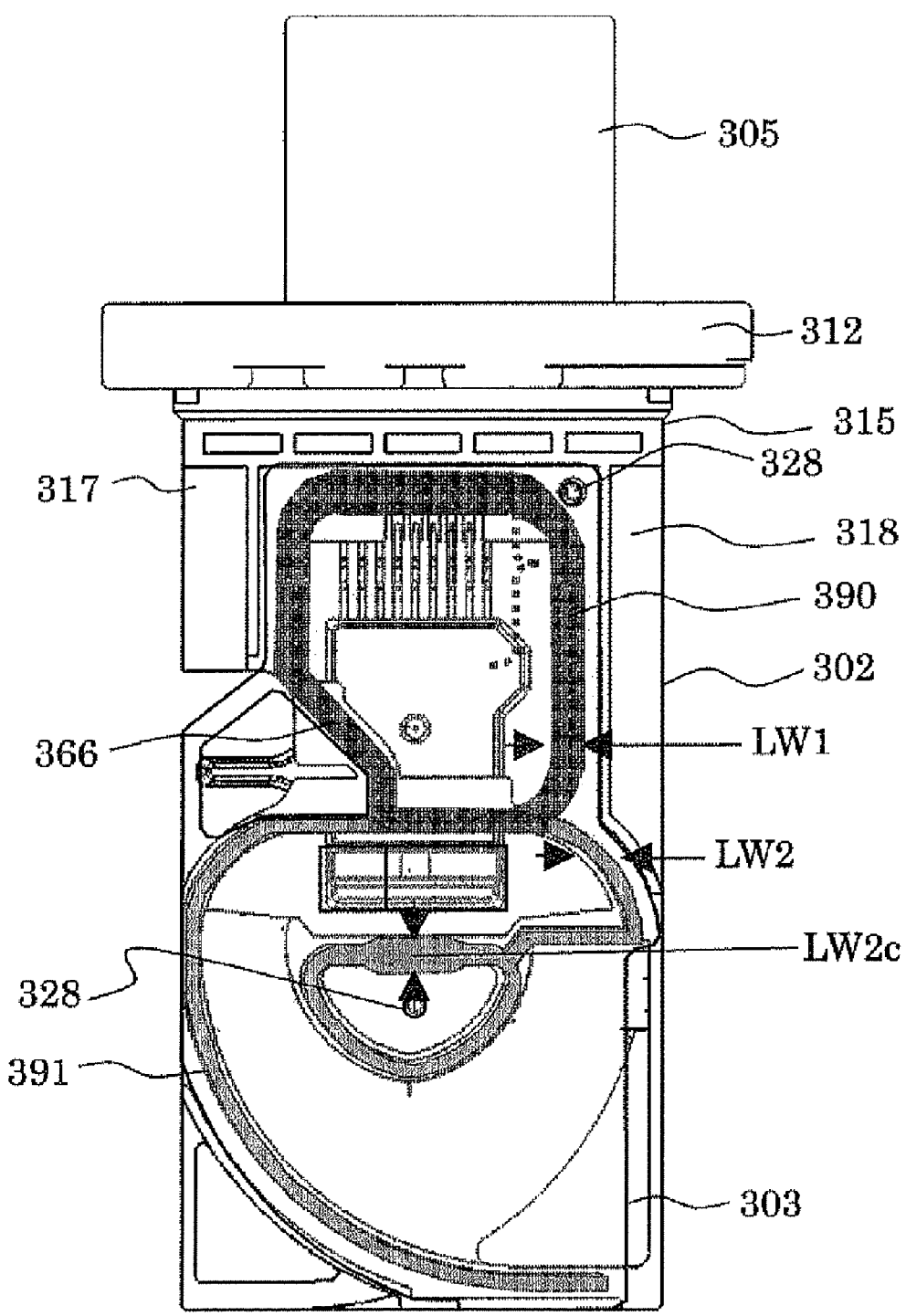
FIG. 13 A front view of the housing of the flow sensor according to a fifth embodiment.

A fifth embodiment of the present invention will be described with reference to FIG. 13. FIG. 13 is a front view of the housing of the thermal type flow sensor according to the present embodiment. In the present embodiment, in the covers 303 and 304, an insertion hole 328 used for an alignment with the housing 302 is formed in two places. However, because of the holes, a weld having low mechanical characteristics is generated near their positions. The weld is a merging portion of resins, and therefore depends on a gate position. For example, it is revealed that when a gate is provided in a part of a passage-side outer peripheral part in the longitudinal direction of the housing 302, the weld exerts an effect on the laser welded part. For the purpose, the insertion holes 326 for positioning formed on the covers ought to avoid being arranged near the laser welded part. When the above is difficult from the standpoint of design or characteristics, the welding width LW2c of a portion corresponding to the weld is made to be greater than the welding width LW2 of the other portion in the welded part 391.

In the structure of the thermal type flow sensor 300 described above, when the gap between the housing 302 and the covers 303 and 304 becomes extremely large due to a relationship of the molding precision, a portion in which the welding is not partially made may be used in the case of the sub-passage part. As the above reason, in the case in which the welding state is worse, during use of the thermal type flow sensor 300, the separation increases and the characteristics themselves are largely deteriorated at some future date. In the case in which the welding is not made from the beginning, in the range of a circuit adjustment for the thermal type flow sensor 300, an effect of the separation is not received in this case and characteristic variation may be reduced.

Sixth Embodiment

Figure 14:
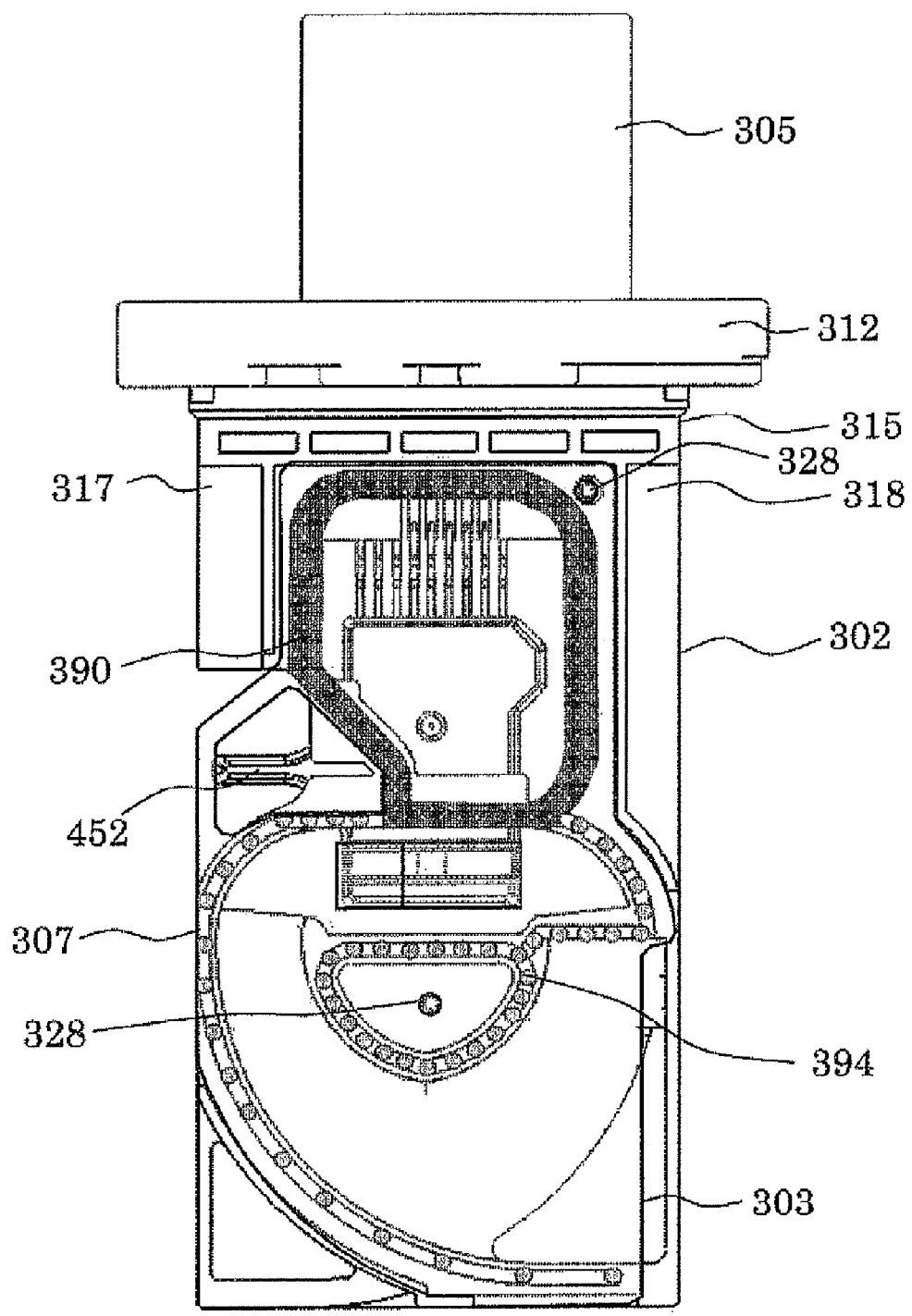
FIG. 14 A front view of the housing of the flow sensor according to a sixth embodiment.
Figure 15:
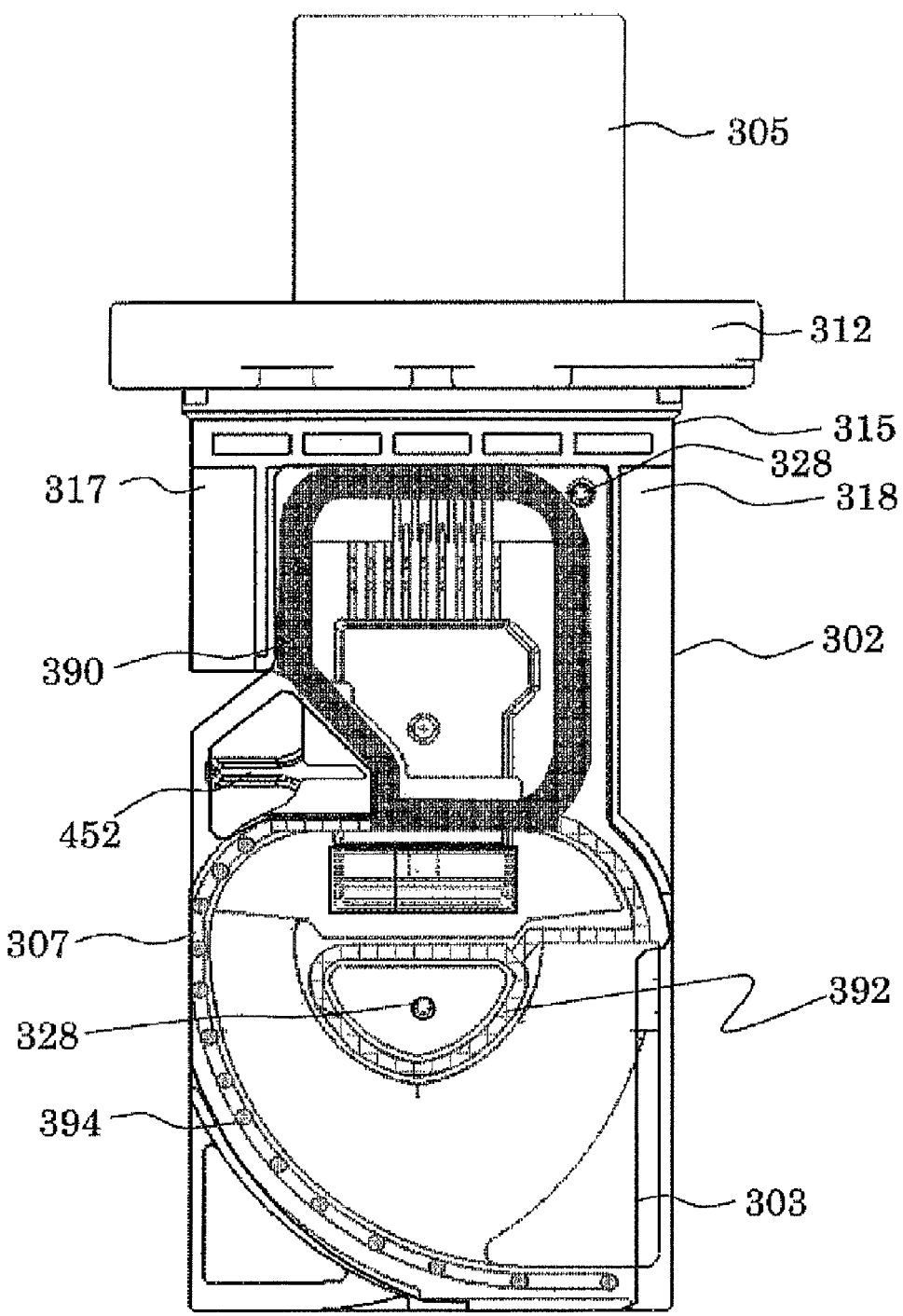
FIG. 15 A front view of the housing of the flow sensor according to the sixth embodiment.
Figure 16:
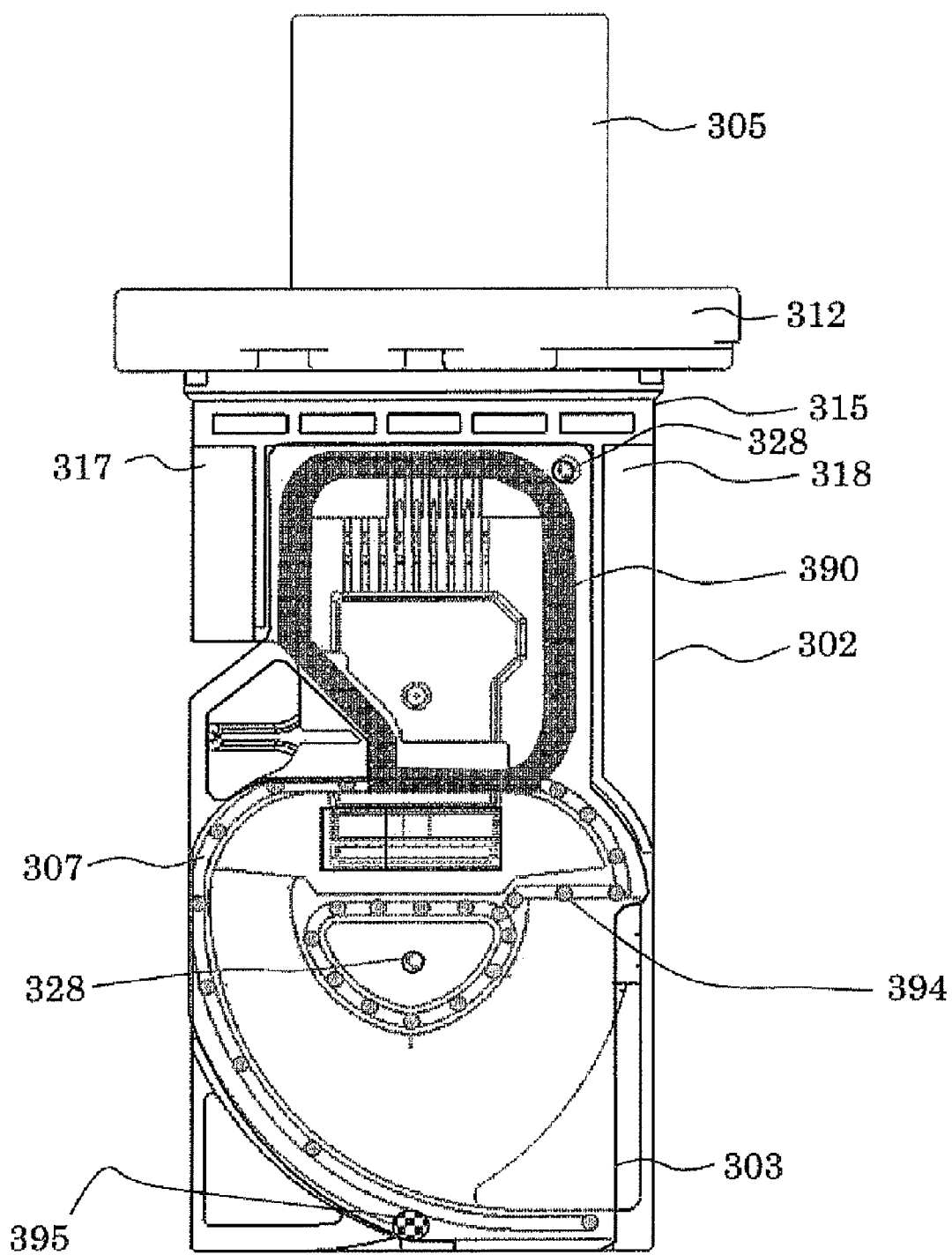
FIG. 16 A front view of the housing of the flow sensor according to the sixth embodiment.

A sixth embodiment of the present invention will be described with reference to FIG. 14. FIG. 14 is a front view of the housing of the thermal type flow sensor according to the present embodiment. The present embodiment is characterized in that the welded part corresponding to the sub-passage part is formed by a plurality of spot welded parts 394. In the case in which the laser welded part is formed, the gap generated in a portion in which the welding is not made near the welded part remains approximately several tens of μm. Therefore, in the case in which the gap is acceptable, a plurality of the spot welded parts 394 are formed, and thereby only the sub-passage part can improve the productivity more. In order to form the spot welded parts 394, laser itself may be set to a pulse and ON/OFF of laser may be controlled. There are advantages that when a pulse drive is adopted, peak power can be controlled. Thereby, the welding amount of the sub-passage part having a long welded part can be reduced as compared to the circuit chamber and power itself is also decreased, and therefore a lifetime of the laser light source is lengthened to thereby reduce costs. In a plurality of the thermal type flow sensors 300 including this structure, the inner peripheral-side sub-passage part is greater than the outer peripheral-side sub-passage part in the effect of a characteristic change given by the gap. Therefore, the inner peripheral-side sub-passage part is preferably made to be smaller than the outer peripheral-side sub-passage part in the gap between the spot welded parts 393 of the sub-passage part. In the case in which the characteristics are deteriorated by the inner peripheral-side gap including the vicinity of the sensor device, as illustrated in FIG. 15, it is sufficient to just form by lines the inner peripheral-side sub-passage part and the welded parts 392 near the device and to just set only the outer peripheral-side sub-passage part to the spot welded parts 394. In addition, this line portion may be formed by a continuous body of the spots. Only if variation is small, the gap of approximately several tens of μm is acceptable, and the molding precision of the covers 303 and 304 and the housing 302 is preferable, as illustrated in FIG. 16, the spot welded parts 394 are partially converted into snap-fit fitting and connecting parts 395 to more reduce the spot welded parts 394. The process permits the productivity to be further improved. In addition, the fitting and connecting parts 395 may be provided on the outer peripheral part that does not relatively exert a negative effect on the characteristics. Further, only if the molding precision is extremely preferable, the fitting and connecting part 395 may be provided in a plurality of places.

Most of the invention is heretofore described with reference to figures from the front cover 303 side, and the same configuration is described also with reference to figures from the rear cover 304 side.

In addition, the present invention can be used for applications of products in which problems are analogous other than the thermal type flow sensor and the present invention can be adopted for the laser welding of general thermoplastic resins. Amorphous resins of the thermoplastic resins include polystyrene (PS), acrylonitrile-styrene (AS), acrylonitrile-butadiene-styrene copolymer (ABS), polyetherimide (PEI), polycarbonate (PC), polyarylate (PAR), polymethylmethacrylate (PMMA), cycloolefin polymer (COP), cycloolefin copolymer (COC), polysulfone (PSF), polyether sulfone (PES), polyvinyl chloride (PVC), and polyvinylidene chloride (PVDC). Other than the above, the crystalline resins include polyethylene (PE), polypropylene (PP), polyoxymethylene (POM), polyethylene terephthalate (PET), polytrimethylene terephthalate (PTT), polyethylenenaphthalate (PEN), polyether ether ketone (PEEK), liquid crystal polymer (LCP), and polytetrafluoroethylene (PTFE). Further, the crystalline resins include their alloy materials, an inorganic material such as glass fiber, and a thermoplastic resin including particular addition agents. Generally, an amorphous resin is excellent in moldability or transparency whereas a crystalline resin is excellent in heat resistance or chemical resistance. Further, the present invention may be applied to not only a thermoplastic resin but also an epoxy-based thermosetting resin.

REFERENCE SIGNS LIST

24 Exhaust air
30 Gas to be measured
110 Internal combustion engine
112 Engine cylinder
114 Engine piston
116 Intake valve
118 Exhaust valve
122 Air cleaner
124 Main passage
126 Throttle body
128 Intake manifold
132 Throttle valve
144 Angle sensor
146 Rotation angle sensor
148 Oxygen sensor
152 Fuel injection valve
154 Spark plug
156 Idle air control valve
200 Control device
300 Thermal type flow sensor 302 Housing
303 Front cover
304 Rear cover
305 External connection part
306 Sub-passage groove
307 Projecting part for laser welding
308 Concave part of joining surface
310 Measuring unit
312 Flange
315 Thermal insulating part
317 Upstream projection
318 Downstream projection
320 Terminal connection part
322 Protection part
324 Knockout pin
326 Insertion hole
328 Aligning part
341 Downstream part
342 Upstream part
343 Inlet
350 Inlet
351 Inlet groove
353 Outlet groove
356 Projecting part
361 External terminal inner edge
380 Projecting part
381 Projecting part
382 Hollow part
386 Front-side flow passage
387 Rear-side flow passage
390 Laser welded part
400 Circuit package
412 Connection terminal
430 Measuring flow passage surface
431 Rear measuring flow passage surface
436 Heat transfer surface exposed part
438 Opening
452 Temperature detection unit
500 Gate cut part
501 Concave part of laser irradiation surface
502 Second concave part of laser irradiation surface
550 Laser light
602 Flow rate detection unit

The invention claimed is:

1. A flow sensor comprising:
a housing;
a cover;
a circuit chamber that is sealed between the housing and the cover and has electronic components and wiring parts built-in; and
a sub-passage part through which a fluid flows that is to be detected;
a first welded part forming the circuit chamber; and
a second welded part forming the sub-passage part and having a welding length longer than that of the first welded part and a welding width smaller than that of the first welded part, wherein
the first welded part and the second welded part have a common portion commonly overlapping from each other, and
a welding width of the common portion is the width of the first welded part.

2. The flow sensor according to claim 1, wherein the welding width of the first welded part and the welding width of the second welded part are an average of the first welded part and an average of the second welded part, respectively.

3. The flow sensor according to claim 1, wherein the common portion is provided in a partition for partitioning into the circuit chamber and the sub-passage part.

4. The flow sensor according to claim 1, wherein in the first welded part forming the circuit chamber, a burr is formed.

5. The flow sensor according to claim 4, wherein a spot size of incident laser light is smaller than a width of the projecting part formed in the housing.

6. The flow sensor according to claim 4, wherein in the second welded part forming the sub-passage part, a burr stored in a concave part of the cover is form; and in the common portion, a burr is formed on only a side of the circuit chamber.

7. The flow sensor according to claim 1, wherein in the housing, a width of a projecting part that has contact with the cover and forms the circuit chamber is equal to or greater than a width of a projecting part forming the sub-passage part.

8. The flow sensor according to claim 1, wherein in the second welded part forming the sub-passage part, a welding width of a part of an outer peripheral-side sub-passage part is smaller than a welding width of an inner peripheral-side sub-passage part.

9. The flow sensor according to claim 1, wherein in the first welded part forming the circuit chamber, a welding width near a flange is greater than another welding width.

10. The flow sensor according to claim 1, wherein in the cover, a width of a laser welded part that is arranged near an insertion hole for positioning is greater than a width of another welded part.

11. The flow sensor according to claim 1, wherein a welded part of a part of the sub-passage part is welded by spot welding.

12. The flow sensor according to claim 11, wherein in the welded part forming the sub-passage part, a spot distance of an inner peripheral-side sub-passage part is smaller than a spot distance of an outer peripheral-side sub-passage part.

13. The flow sensor according to claim 1, further comprising an aligning part of the cover and the housing near the sub-passage part.

14. The flow sensor according to claim 1, wherein in the cover and the housing, glass fiber is added to a thermoplastic resin, and an addition rate of glass fiber of the cover is smaller than an addition rate of glass fiber of the housing.

15. The flow sensor according to claim 1, wherein a crystallinity of a material of the housing is greater than a crystallinity of a material of the cover.

* * * * *